US012098914B2

(12) United States Patent
Ng et al.

(10) Patent No.: US 12,098,914 B2
(45) Date of Patent: Sep. 24, 2024

(54) SURFACE ROUGHNESS AND EMISSIVITY DETERMINATION

(71) Applicant: APPLIED MATERIALS, INC., Santa Clara, CA (US)

(72) Inventors: Eric Chin Hong Ng, Milpitas, CA (US); Todd J. Egan, Fremont, CA (US); Mehdi Vaez-Iravani, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/936,608

(22) Filed: Sep. 29, 2022

(65) Prior Publication Data
US 2024/0110782 A1  Apr. 4, 2024

(51) Int. Cl.
| | | |
|---|---|---|
| G01B 11/30 | (2006.01) | |
| G01J 5/00 | (2022.01) | |
| G01J 5/0806 | (2022.01) | |
| G01J 5/0808 | (2022.01) | |

(52) U.S. Cl.
CPC .......... G01B 11/303 (2013.01); G01J 5/0003 (2013.01); G01J 5/0806 (2013.01); G01J 5/0808 (2022.01)

(58) Field of Classification Search
CPC ..... G01B 11/303; G01J 5/0003; G01J 5/0806; G01J 5/0808
See application file for complete search history.

(56) References Cited

U.S. PATENT DOCUMENTS

| | | | | |
|---|---|---|---|---|
| 4,830,486 A | * | 5/1989 | Goodwin | G01S 17/34 356/477 |
| 5,938,335 A | * | 8/1999 | Yam | G01J 5/0003 374/124 |
| 6,183,130 B1 | * | 2/2001 | Adams | G01J 5/0818 219/405 |
| 2004/0115843 A1 | | 6/2004 | Wack et al. | |
| 2006/0054497 A1 | | 3/2006 | Jaso et al. | |

(Continued)

FOREIGN PATENT DOCUMENTS

| | | |
|---|---|---|
| JP | 2016143651 A | 8/2016 |
| WO | 2021061541 A1 | 4/2021 |

OTHER PUBLICATIONS

International Search Report and Written Opinion for International Application No. PCT/US2023/033631, mailed Jan. 16, 2024, 12 Pages.

*Primary Examiner* — David P Porta
*Assistant Examiner* — Gisselle M Gutierrez
(74) *Attorney, Agent, or Firm* — Lowenstein Sandler LLP

(57) ABSTRACT

A system includes a radiation source configured to emit a radiation beam. The system further includes a first optical sensor configured to detect a first intensity of a first portion of the radiation beam reflected from a surface of an object. The system further includes a second optical sensor configured to detect a second intensity of a second portion of the radiation beam scattered by the surface of the object. The system further includes a processing device communicatively coupled to the first optical sensor and the second optical sensor. The processing device is configured to determine at least one of a roughness or an emissivity of the surface of the object based on a comparison of the first intensity and the second intensity.

20 Claims, 9 Drawing Sheets

(56) References Cited

U.S. PATENT DOCUMENTS

| | | |
|---|---|---|
| 2010/0225926 A1 | 9/2010 | Van Amstel et al. |
| 2019/0212274 A1* | 7/2019 | Zerrad .................. G01B 11/30 |
| 2023/0236569 A1* | 7/2023 | Zhang ............... H01L 21/68735 |
| | | 700/121 |
| 2023/0236583 A1* | 7/2023 | Zhang .................... H01L 22/12 |
| | | 700/95 |

* cited by examiner

SURFACE ROUGHNESS AND EMISSIVITY DETERMINATION

TECHNICAL FIELD

Embodiments of the present disclosure generally relate to the determination of surface roughness and emissivity of an object, and more specifically relate to systems, methods and devices for optically determining surface roughness and emissivity of an object.

BACKGROUND

Emissivity is a fundamental property of a material. In semiconductor processing, in particular, accurately characterizing emissivity and/or surface roughness of a surface for a chamber component can have a direct impact on the quality of processed substrates. Emissivity can be affected by a variety of material parameters, including topography (e.g., surface roughness), reflectance, and so on.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Some of the embodiments described herein cover a system that includes a radiation source configured to emit a radiation beam. The system further includes a first optical sensor configured to detect a first intensity of a first portion of the radiation beam reflected from a surface of an object. The system further includes a second optical sensor configured to detect a second intensity of a second portion of the radiation beam scattered by the surface of the object. The system further includes a processing device communicatively coupled to the first optical sensor and the second optical sensor. The processing device is configured to determine at least one of a roughness of the surface of the object or an emissivity of the surface of the object based on a comparison of the first intensity and the second intensity.

Additional or related embodiments described herein cover a method that includes emitting, from a radiation source, a radiation beam. The method further includes detecting, by a first optical sensor, a first intensity of a first portion of the radiation beam reflected from a surface of a chamber component of a processing chamber. The method further includes detecting, by a second optical sensor, a second intensity of a second portion of the radiation beam scattered by the surface of the chamber component. The method further includes determining, via a processing device communicatively coupled to the first optical sensor and the second optical sensor, at least one of a roughness of the surface of the chamber component or an emissivity of the surface of the chamber component based on a comparison of the first intensity and the second intensity.

In further embodiments, a non-transitory machine-readable storage medium includes instructions that, when executed by a processing device, cause the processing device to perform operations including receiving data associated with at least one of an emissivity or a roughness of a surface of a chamber component of a processing chamber. The operations further include inputting, into a trained machine learning model, the data associated with at least one of the emissivity or the roughness of the surface of the chamber component. The operations further include receiving, from the trained machine learning model, an output including predicted substrate process results. The predicted substrate process results correspond to future substrates to be processed in the processing chamber using the chamber component.

Numerous other features are provided in accordance with these and other aspects of the disclosure. Other features and aspects of the present disclosure will become more fully apparent from the following detailed description, the claims, and the accompanying drawings.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1A:
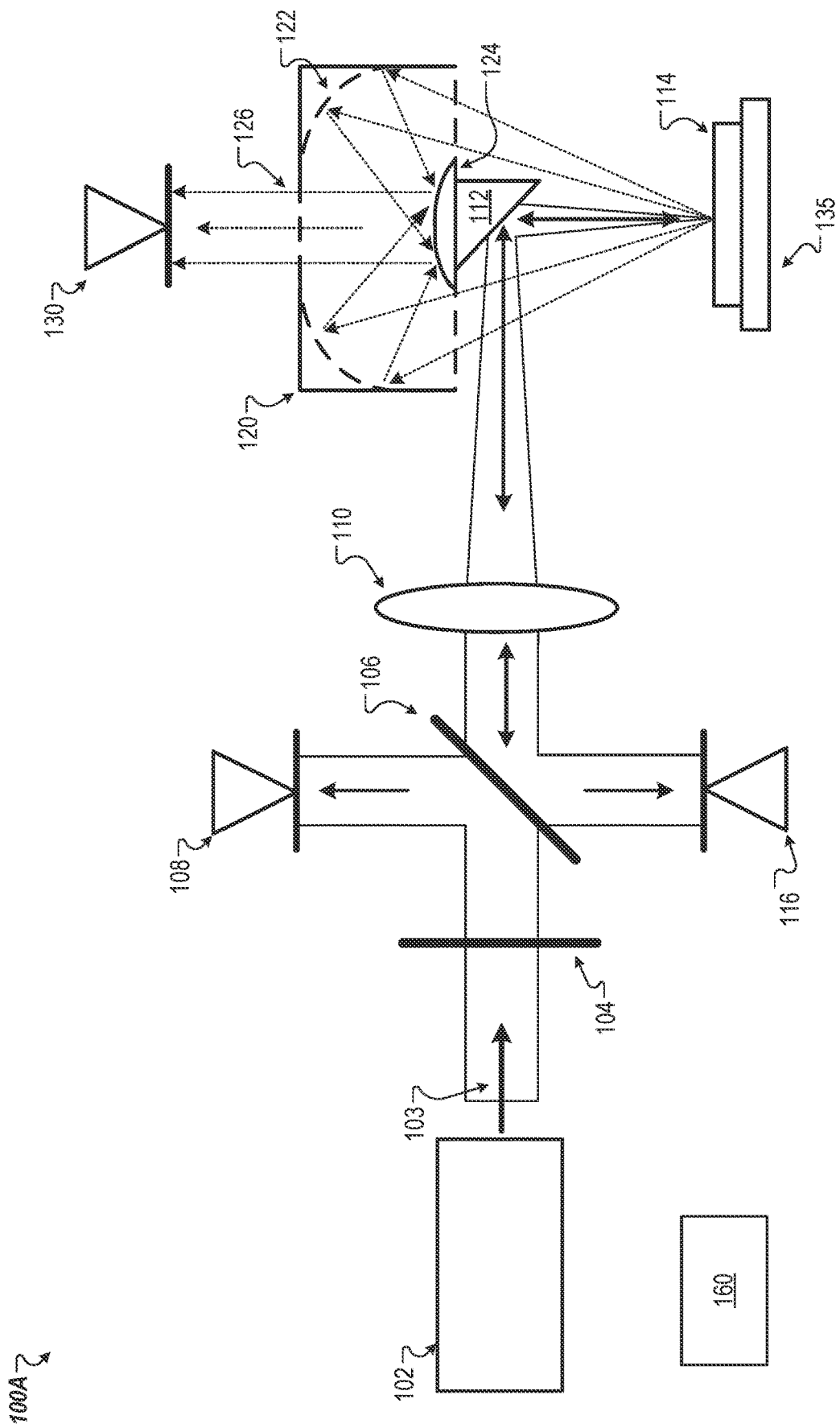
FIG. 1A illustrates a simplified side view of a system for optically determining emissivity and/or surface roughness of objects, according to aspects of the present disclosure.

Embodiments of the present disclosure are directed to systems and methods for determining surface roughness and emissivity. Process results of manufacturing processes depend on many factors, including process recipes, and chamber component conditions. For example, process results may vary across the surface of a substrate based on the emissivity and/or surface roughness of a component of a processing chamber used to perform a process (e.g., a deposition process, etch process, etc.) on the substrate. For example, process results may vary across the surface of a substrate based on a condition of a showerhead, a condition of a lid, a condition of a nozzle, a condition of a substrate support that supports the substrate, a condition of a chamber liner, conditions of pumps and/or valves, and so on. The emissivity and/or surface roughness of one or more of these components can have a direct impact on the quality of films deposited on substrates. The emissivity of an object (e.g., a chamber component) is also affected by a variety of factors, including topography (e.g., surface roughness). Thus, it can be useful to classify surface roughness together with emissivity of an object Typically, the wavelength regime over which the emissivity of a chamber component most affects the quality of processed substrates is the mid-Infrared (mid-IR), specifically in the 3-5 μm range. Conventional emissometers (e.g., tools to measure emissivity) typically measure and report emissivity in this wavelength range. These conventional emissometers operate on the principle that, for a given sample, a direct relationship exists between emissivity and reflected radiation (e.g., reflected by the surface of an object to be measured). Thus, conventional emissometers operate by irradiating an object with light from a source and collecting reflected light from the surface of the object. The reflected light is detected and then reported.

Conventional systems and methods of detecting emissivity of objects suffer from a number of shortcomings. First, conventional systems have little-to-no control over the size of the region illuminated by the light source (e.g., "spot size"). Conventional systems and methods thus are ineffective at analyzing small surface areas or geometries.

Secondly, and relatedly, conventional systems utilize relatively weak radiation from omni-directional radiation sources (e.g., via an aperture) to irradiate the surface of an object. The omni-directional radiation of conventional systems contributes to a limited collection of s reflected light (e.g., reflected radiation). Thus, conventional systems are inherently sensitive to noise and are not capable of providing the accuracy requisite for characterizing small object geometries (e.g., less than 1,000 microns). To increase accuracy, conventional systems can slow the measurement process and utilize certain techniques to enhance a signal-to-noise ratio. To increase the signal-to-noise ratio, some conventional systems use a larger aperture to pass the radiation to the object, but this leads to inaccuracy of the system and increased spot size, as described above.

Aspects and implementations of the instant disclosure address the above-described and other shortcomings of conventional systems by providing a system (e.g., an optical measuring tool) to detect emissivity and/or surface roughness of an object. In some embodiments, a system includes a radiation source such as a supercontinuum laser operating in the mid-IR range that emits a beam of radiation (e.g., a laser beam). The radiation beam may be directed toward the surface of an object by one or more mirrors and/or lenses. In some embodiments, a lens focusses the radiation beam onto a "spot" on the surface of the object. The surface of the object reflects and/or scatters portions of the radiation beam. In some embodiments, the reflected portion having a first intensity is reflected back to the system and is detected by an optical detector of the system. In some embodiments, the scattered portion having a second intensity is collected by the system (e.g., by a reflective objective such as a Schwarzschild objective) and detected by another optical detector of the system. A processing device (e.g., a computing device, etc.) determines the surface roughness and/or emissivity of the object based on comparing the intensity of the reflected radiation (e.g., the first intensity) with the intensity of the scattered radiation (e.g., the second intensity).

Embodiments of the present disclosure provide advantages over conventional systems described above. Particularly, some embodiments described herein detect emissivity with greater accuracy by providing a radiation source that emits a beam of radiation rather than an omni-directional source of conventional systems. The radiation beam is stronger (e.g., has greater intensity) and is more focused, thus providing greater intensity of reflected and/or scattered radiation from the surface of the object. This greater intensity decreases the sensitivity of the system to signal noise, allowing for greater accuracy. Additionally, some embodiments described herein can simultaneously detect and characterize both emissivity and surface roughness of a measured object. By using two optical detectors, both reflected radiation (e.g., "bright field") and scattered radiation (e.g., "dark field") can be measured to provide data for characterizing emissivity and surface roughness of an object. This data can be used (e.g., via machine learning techniques described herein below) to predict substrate process results for substrates to be processed in a processing chamber using a measured chamber component (e.g., a measured object). Additionally, the radiation beam used in embodiments described herein allows for faster measuring of emissivity when compared to conventional systems.

FIG. 1A illustrates a simplified side view of a system 100A for optically determining emissivity and/or surface roughness of objects, according to aspects of the present disclosure. In some embodiments, the system 100A is an optical measuring tool (e.g., an emissometer).

The system 100A includes a radiation source 102 configured to emit a radiation beam 103, which may be a focused radiation beam. In embodiments, radiation source 102 is a laser, such as a semiconductor laser (e.g., that uses laser diodes). Other types of layers that may be used include gas lasers, solid-state lasers, fiber lasers, and liquid lasers. In some embodiments, the radiation source 102 is a supercontinuum laser. In optics, a supercontinuum is formed when a collection of non-linear processes act together upon a pump beam in order to cause severe spectral broadening of the original pump beam. The result is a spectral continuum. In some embodiments, radiation source 102 is a supercontinuum laser configured to operate in the mid-IR range (e.g., radiation source 102 is a mid-IR supercontinuum laser). In some embodiments, the radiation source 102 emits electromagnetic radiation having a wavelength in the range of 1-6 μm. In further embodiments, the radiation source 102 emits radiation having a wavelength in the range of 3-5 μm. In some embodiments, the radiation beam 103 is a collimated beam (e.g., the radiation source 102 is configured to emit a collimated beam). In some embodiments, the radiation beam 103 has a diameter of between about 1 millimeter and about 10 millimeters. In some embodiments, the radiation beam 103 has a diameter of about 5 millimeters.

In some embodiments, the radiation beam 103 is directed through a polarizing filter 104 (also referred to as a polarizer). The polarizing filter 104 may be disposed along the optical axis of the radiation beam 103 between the radiation source 102 and a beam splitter 106. In some embodiments, the polarizing filter 104 is configured to polarize the radiation beam 103 emitted from the radiation source 102. In some embodiments, the polarizing filter 104 linearly polarizes the radiation beam 103. In some embodiments, the polarizing filter 104 is omitted.

Often, beam splitters (such as beam splitter 106) are polarization dependent, meaning that the ratio of reflected radiation to transmitted radiation is a function of the polarization and wavelength of the incoming radiation. Although the radiation beam 103 emitted by the radiation source 102 may be substantially unpolarized, there is a possibility of some residual and varying polarization preference between the horizontal and vertical directions. Under such conditions, a slight modulation in the amount of radiation and/or the polarization of the radiation that is transmitted by the beam splitter 106 may exist. This modulation could introduce errors in the normalization process associated with optical sensor 108 described herein. Thus, by including the polarizing filter 104 in some embodiments, any shift in the instantaneous polarization of the radiation beam 103 will be transformed into an amplitude fluctuation which will affect radiation transmitted by the beam splitter 106 and radiation reflected by the beam splitter 106 in the same way (e.g., the amplitude of transmitted and reflected radiation will both increase or decrease during a change in polarization of the radiation beam 103). More functionality of the beam splitter is described herein below.

The radiation beam 103, in some embodiments, passes through beam splitter 106 (optionally after having passed through polarizing filter 103). In some embodiments, a unidirectional mirror is used instead of a beam splitter.

In some embodiments, all or substantially all of the radiation beam 103 passes through the beam splitter 106. Alternatively, part of the radiation beam may be reflected by the beam splitter 106 and directed to an optical sensor 108 while another part of the radiation beam is transmitted by the beam splitter (e.g., towards lens 110). In some embodiments, most of the intensity of the radiation beam 103 is transmitted through the beam splitter 106, while a small fraction (e.g., 2-10%) of the intensity of the radiation beam 103 is reflected towards optical sensor 108. In some embodiments, substantially equal intensities of the radiation beam 103 are transmitted through the beam splitter 106 and reflected (e.g., by the beam splitter 106) towards optical sensor 108.

The optical sensor 108 may be configured to detect an intensity of the fraction of the radiation beam reflected by the beam splitter 106. Optical sensor 108 (as well as optical sensors 116, 130) may be or include a sensor having one or more (e.g., a matrix) of sensing elements. In some embodiments, sensing elements are charge coupled device (CCD) sensors. In some embodiments, sensing elements are complementary metal-oxide semiconductor (CMOS) type image sensors. In some embodiments, sensing elements are mercury cadmium telluride (HgCdTe) photoconductive detectors. Other types of image sensors known to those skilled in the art may also be used for optical sensors 108, 116, 130. In some embodiments, optical sensors 108, 116, and/or 130 include or are each coupled to a galvanometer for measuring electrical current induced by the reception of radiation.

The detected intensity by the optical sensor 108 may be used to normalize intensity of radiation detected by optical sensor 116 and/or optical sensor 130 as described herein below. For example, variations in the intensity of radiation detected by optical sensor 108 can be used to attenuate variations in the intensity of radiation output by radiation source 102 and detected by optical sensor 116 and/or by optical sensor 130. Specifically, the intensity of radiation detected by optical sensor 108 can be used as a relative benchmark for optical sensor 116 and optical sensor 130 because the intensity of radiation detected by optical sensor 108 is directly related to the intensity of the radiation beam 103, in some embodiments. In some examples, fluctuations in power of the radiation beam 103 output by the source 102 can be detected by the optical sensor 108. In some embodiments, the signal output by optical sensor 108 is used to stabilize the system 100. In embodiments, the measurement system variation (e.g., variation between measurements of the same radiation intensity) can be lowered based on a signal output by the optical sensor 108. In some embodiments, the signal output by the optical sensor 108 can lower variation of measured values (e.g., of emissivity and/or surface roughness) to less than 0.1%. Accordingly, use of the beam splitter 106 and optical sensor 108 can increase stability of the system 100 so that there is a variation of less than 0.1% in embodiments. In other embodiments, variation may be less than 0.2%, less than 0.3%, less than 0.4%, less than 0.5%, less than 0.6%, less than 0.6%, less than 0.7%, less than 0.8%, less than 0.9%, or less than 1.0%.

Use of the polarizing filter 104 described above further improves the stability of the system 100. In particular, there may be slight fluctuations in polarization of radiation output by radiation source 102. The amount of the radiation beam 103 that passes through beam splitter 106 and the amount of the radiation beam 103 that is reflected by beam splitter 106 may have some dependence on polarization. Accordingly, the slight fluctuations in polarization may be detected as variations in intensity detected by one or more of the optical sensors 108, 116, 130, contributing to system instability. However, by introducing polarization filter 104, any fluctuations in polarization of radiation beam 103 are removed, resulting in increased system measurement stability (a reduction in measurement variation).

In some embodiments, the beam splitter 106 transmits the radiation beam (e.g., a portion of the radiation beam, most of the radiation beam, all of the radiation beam except the fraction reflected toward the optical sensor 108, etc.) toward one or more lens 110 that may lie on an optical axis of the system. In some embodiments, lens 110 is a doublet lens. In some embodiments, the lens 110 is an objective lens. The lens 110 may be configured to focus the radiation beam to intensify and/or shrink the diameter of the radiation beam. The lens 110 may have a focal length of about 50 millimeters to about 100 millimeters. In some embodiments, the lens 110 may have a focal length of about 75 millimeters. In some embodiments, the lens 110 may focus the radiation beam to a spot size of less than approximately 200 microns in diameter on the surface of an object 114. In some embodiments, the lens 110 focuses the radiation beam 103 to a spot size of less than 300 microns. In some embodiments, the lens 110 focuses the radiation beam 103 to a spot size of less than 500 microns. In some embodiments, the spot size is approximately 50 microns to 90 microns. The spot size may be a function of focal length of lens 110, wavelength of radiation beam 103, and initial width of radiation beam 103. In some embodiments, the spot size can be variable. For example, in some embodiments, the lens 110 is attached to an actuator or other translation mechanism that may move a position of the lens 110 along the optical axis of the system 100. Such movement of the position of the lens 110 may change a focal setting of the optical system. In some embodiments, an actuator coupled to the lens 110 can move the lens 110 along the optical axis to change the spot size on the surface of an object 114 being measured.

In some embodiments, the object 114 sits on a support 135. The support 135 may be a moveable stage. In some embodiments, the support 135 may be moveable about one or more axes (e.g., one axis, two axes, three axes, etc.). For example, the support 135 may be moveable in an XY plane orthogonal (e.g., substantially orthogonal) to the direction of the incoming beam of radiation. In some embodiments, the support 135 is rotatable about one or more axes. In some embodiments, the support 135 may have six or fewer degrees of freedom.

In some embodiments, the radiation beam is transmitted by the lens 110 toward an angled mirror 112 that reflects the focused radiation beam onto the surface of the object 114. In some embodiments, the surface of the object 114 is at least partially emissive and may have a surface roughness. In some examples, the surface of the object 114 may reflect radiation and/or scatter radiation. The amount of reflected radiation and/or scattered radiation may depend on one or more properties of the surface of the object, such as roughness, reflectance, absorbance, index of refraction, and so on. The reflected radiation and/or scattered radiation may be measured (e.g., via system 100). In some embodiments, the object 114 is a chamber component of a substrate processing chamber, such as a component of processing chamber 200 of FIG. 2. The surface of the object 114 to be measured may be substantially perpendicular to the incoming beam of radiation in some embodiments. Accordingly, if the object has a non-flat surface, then the orientation of the object relative to the system 100 may be changed as different parts of the object are measured so that a normal to a point of the surface of the object being measured is aligned with rays of the radiation beam 103.

In some embodiments, the mirror 112 is coupled to a bottom surface (e.g., as illustrated) of a convex mirror 124 of a reflective objective 120. Placement and/or size of the mirror 112 may be such that scattered radiation (e.g., from the surface of the object 114) is not blocked by the mirror 112. A first portion of the radiation beam may be reflected by the surface of the object 114 back toward the mirror 112. The first portion of the radiation beam may be referred to as a reflected radiation beam. The reflected radiation beam may then be reflected off of mirror 112, back through lens 110, and reflected off of beam splitter 106 toward optical sensor 116.

In some embodiments, the beam splitter 106 reflects the reflected portion of the radiation beam toward the optical sensor 116. The optical sensor 116 may be configured to detect the intensity of the portion of the radiation beam reflected by the surface of the object 114 (i.e., the reflected radiation beam). In some embodiments, the intensity of the radiation detected by the optical sensor 116 (e.g., the intensity of the reflected radiation beam) is related to of the emissivity and/or surface roughness of the surface of the object 114.

In some embodiments, radiation scattered by the surface of the object 114 (e.g., indicated by the dashed arrows in FIG. 1, and referred to as scattered radiation beams), is collected by a reflective objective 120, referred to as a light collector. The reflective objective 120 may include a concave-mirrored inner surface 122 and a convex mirror 124 disposed beneath or proximate to the inner surface 122. The scattered radiation beams may be collected by the concave-mirrored inner surface 122 and reflected towards the convex mirror 124. In some embodiments, the convex mirror 124 forms a central obscuration region of the reflective objective 120. In some embodiments, the convex mirror 124 reflects the collected radiation from the scattered radiation beams through an aperture 126 in the concave-mirrored inner surface 122 toward an optical sensor 130. In some embodiments, the reflective objective 120 is a Schwarzschild objective. However, a person of skill in the art should recognize that use of other reflective objectives is also possible. In some embodiments, the optical sensor 130 is configured to detect the intensity of the radiation scattered by the surface of the object 114 (e.g., of the scattered radiation beams). In some embodiments, the intensity of the radiation detected by the optical sensor 130 (e.g., the intensity of the radiation scattered by the surface of the object 114) is related to the emissivity and/or surface roughness of the surface of the object 114.

In some embodiments, a system controller 160 (e.g., computing device, processing device, etc.) may be communicatively coupled to the optical sensor 108, the optical sensor 116, and/or the optical sensor 130. System controller 160 may be and/or include a computing device such as a personal computer, a server computer, a programmable logic controller (PLC), a microcontroller, system on a chip (SoC), and so on. System controller 132 may include one or more processing devices, which may be general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices such as an application specific integrated circuit (ASIC), a field programmable gate array (FPGA), a digital signal processor (DSP), network processor, or the like. System controller 132 may include a data storage device (e.g., one or more disk drives and/or solid state drives), a main memory, a static memory, a network interface, and/or other components. System controller 132 may execute instructions to perform any one or more of the methodologies and/or embodiments described herein. The instructions may be stored on a computer readable storage medium, which may include the main memory, static memory, secondary storage and/or processing device (during execution of the instructions). System controller 132 may also be configured to permit entry and display of data, operating commands, and the like by a human operator.

The system controller 160 may receive output signals from each of the optical sensors. In some embodiments, the system controller 160 may determine (e.g., via processing logic) the roughness and/or the emissivity of the surface of the object 114 based on a comparison of the intensity of radiation detected by the optical sensor 116 and the intensity of radiation detected by the optical sensor 130. In some embodiments, emissivity is equivalent to one minus the reflectance of the surface of the object 114 (e.g., 1−reflectance). In some embodiments, the intensity of reflected radiation (e.g., detected by optical sensor 116) is related to emissivity. For example, emissivity can be considered as complimentary to reflectivity. Reflectivity can be computed by a ratio of the intensity of the reflected radiation beam (e.g., represented by an intensity of radiation detected by optical sensor 116) to the intensity of the radiation detected by optical sensor 108. Reflectivity may be indicative of the emissivity of the surface of object 114 through the relationship emissivity=1−reflectivity. In some embodiments, a ratio of the intensity of scattered radiation to the intensity of reflected radiation is indicative of surface roughness.

In some examples, a higher intensity of reflected radiation (e.g., detected by optical sensor 116) as compared to an intensity of scattered radiation (e.g., detected by optical sensor 130) may indicate a lower emissivity and/or lower surface roughness of the surface of the object 114. In some examples, a lower intensity of reflected radiation as compared to an intensity of scattered radiation may indicate a higher emissivity and/or a higher surface roughness. In some examples, a higher intensity of scattered radiation (e.g., detected by optical sensor 130) as compared to an intensity of reflected radiation may indicate a higher surface roughness, while a lower intensity of scattered radiation as compared to an intensity of reflected radiation may indicate a lower surface roughness.

In some embodiments, the system controller 160 may determine that the surface roughness of the object 114 is related to a ratio of the intensity of scattered radiation to the intensity of reflected radiation. Thus, the processing device may determine the surface roughness of the object 114 based on a ratio of the intensity of radiation detected by the optical sensor 130 to the intensity of radiation detected by the optical sensor 116.

In some embodiments, as described herein above, the system controller 160 may determine the surface roughness and/or emissivity further based on sensor data from optical sensor 108. Specifically, the system controller 160 may determine a normalization factor based on sensor data from the optical sensor 108. The normalization factor can be used to normalize sensor data from the optical sensor 116 and/or optical sensor 130. For example, variations in the amplitude of the radiation beam 103 may cause corresponding variations in the reflected radiation detected by the optical sensor 116 and/or the scattered radiation detected by optical sensor 130. These variations may cause variations in the surface roughness and/or emissivity calculated by the system controller 160. However, the variations in radiation beam 103 amplitude may also be detected by optical sensor 108. By determining a normalization factor based on the sensor data from the optical sensor 108 (e.g., where the sensor data corresponds to variations in the amplitude of the radiation beam 103), the variations in sensor data from the optical sensors 116 and 130 can be normalized (e.g., based on the normalization factor). The normalized sensor data can be used by the system controller 160 to determine the surface roughness and/or emissivity. In some embodiments, the normalization factor is proportional to the product of intensity detected by optical sensor 108 and a target intensity. The output signal of optical sensor 116 and/or optical sensor 130 can be multiplied by the normalization factor to determine a corrected signal. In some embodiments, the normalization factor can address frequency and/or phase mismatch between sensors, non-linearity of sensor measurement, and/or other non-idealities of the system 100A.

In some embodiments, a map of surface roughness and/or emissivity of the object 114 can be generated by the system 100A. By moving the object 114 relative to the incoming beam of radiation (e.g., via the moveable support 135) and determining surface roughness and/or emissivity at various discrete points on the surface of the object, a map of surface roughness and/or emissivity can be generated. In some embodiments, the generated surface roughness and/or emissivity map may be based on measurements of surface roughness and/or emissivity at various known points across the surface of the object 114. This map can be used to determine various predicted elements as described herein below.

In some embodiments, the system 100 includes a camera instead of or in addition to one or more components of the system 100A. In some examples, a camera operating in the mid-IR range can image the surface of the object 114 to determine emissivity and/or roughness information of the surface of the object 114.

Figure 1B:
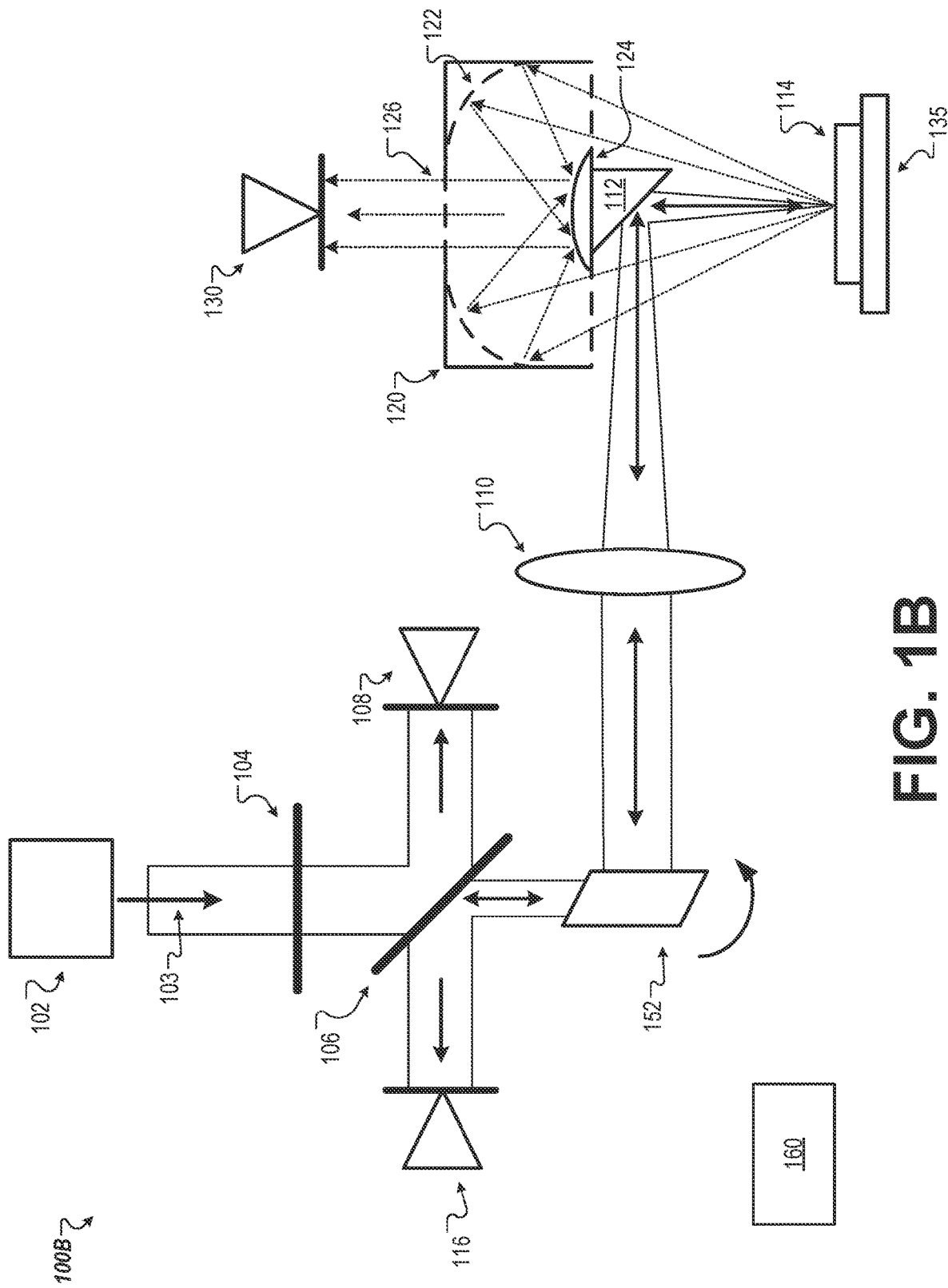
FIG. 1B illustrates a simplified side view of a system for optically determining emissivity and/or surface roughness of objects, according to aspects of the present disclosure.

FIG. 1B illustrates a simplified side view of a system 100B for optically determining emissivity and/or surface roughness, according to aspects of the present disclosure. Features of system 200 that are similarly numbered to the features of system 100 may have similar structure and/or function as described herein above. In some embodiments, system 100B includes a rotatable mirror 152 configured to direct the radiation beam toward the lens 110. In some examples, the optical axis of the radiation source 102 may be set at approximately at a right angle (e.g., 90 degrees) to the optical axis of the lens 110. In some embodiments, the rotatable mirror 152 is disposed substantially at the focal plane of the lens 110. In some embodiments, the rotatable mirror 152 may reflect the radiation beam from the radiation source at an angle toward the lens 110. Responsive to rotation of the rotatable mirror 152 about an axis perpendicular to the optical axis of the lens 110 (e.g., an axis up and down the drawn page or into and out of the drawn page), the rotatable mirror 152 may cause the radiation beam to move across the surface of the object 114 in periodic motion. For example, the lens 110 may transform angular motion of the rotatable mirror 152 into lateral motion (e.g., periodic lateral motion) of the radiation beam. In some examples, the rotation of the rotatable mirror 152 causes the radiation beam to periodically move back and forth across the surface of the object 114 (e.g., in periodic motion). The back and forth motion of the radiation beam may allow for scanning the surface of the object 114.

In some embodiments, as the object 114 is slowly moved by the support 135 in the Y direction of an XY plane, the radiation beam is rapidly moved back and forth in the X direction (e.g., of the XY plane) to scan the surface of the object 114. Data collected during the scanning (e.g., reflected and/or scattered radiation intensities) can be used to determine (e.g., by system controller 160) an emissivity surface profile map and/or a surface roughness profile map (e.g., one or more profile maps) of the object 114.

Figure 2:
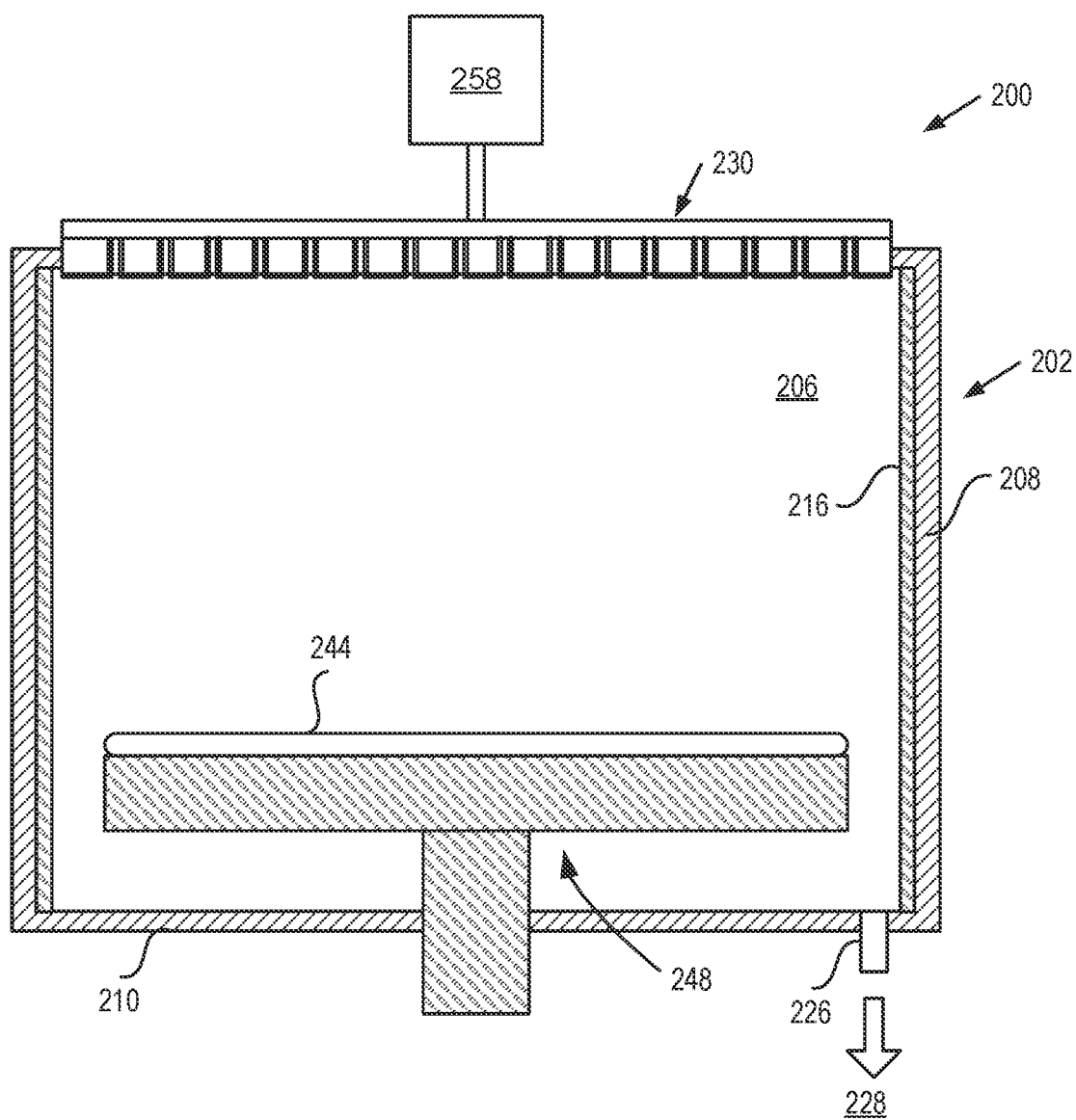
FIG. 2 depicts a sectional view of one embodiment of a processing chamber.

FIG. 2 is a sectional view of a processing chamber 200 (e.g., a semiconductor processing chamber, display processing chamber, etc.) having one or more chamber components that have been characterized using system 100A of FIG. 1A or system 100B of FIG. 1B, in accordance with embodiments of the present disclosure. The processing chamber 200 may be used, for example, for processes in which a corrosive plasma environment having plasma processing conditions is provided. For example, the processing chamber 200 may be a chamber for a plasma etcher or plasma etch reactor, a plasma cleaner, and so forth. Other types of chambers may include deposition chambers, clean chambers, oxidation chambers, and so on. Examples of chamber components that may have their surface roughness and/or emissivity characterized include a substrate support assembly 248, an electrostatic chuck (ESC), a ring (e.g., a process kit ring or single ring), a chamber wall, a base, a gas distribution plate, a showerhead 230, gas lines, a nozzle, a lid, a liner, a liner kit, a shield, a plasma screen, a flow equalizer, a cooling base, a chamber viewport, a chamber lid, and so on. The chamber components may be composed of metals, metal alloys, ceramics, and any combination thereof. The chamber components may include coatings, such as plasma resistant or corrosion resistant coatings, the surfaces of which may be characterized using the system of FIGS. 1A-1B. The coatings may be coatings deposited or grown via atomic layer deposition, plasma spray coating, chemical vapor deposition, ion-assisted deposition, sputtering, physical vapor deposition, electroplating, anodization, and so on.

In one embodiment, the processing chamber 200 includes a chamber body 202 and a showerhead 230 that enclose an interior volume 206. The showerhead 230 may include a showerhead base and a showerhead gas distribution plate. Alternatively, the showerhead 230 may be replaced by a lid and a nozzle in some embodiments. The chamber body 202 may be fabricated from aluminum, stainless steel or other suitable material. The chamber body 202 generally includes sidewalls 208 and a bottom 210. Any of the showerhead 230 (or lid and/or nozzle), sidewalls 208 and/or bottom 210 may include the a characterized coating.

An outer liner 216 may be disposed adjacent the sidewalls 208 to protect the chamber body 202. The outer liner 216 may be characterized. In one embodiment, the outer liner 216 is fabricated from aluminum oxide.

An exhaust port 226 may be defined in the chamber body 202, and may couple the interior volume 206 to a pump system 228. The pump system 228 may include one or more pumps and throttle valves utilized to evacuate and regulate the pressure of the interior volume 206 of the processing chamber 200.

The showerhead 230 may be supported on the sidewall 208 and/or top of the chamber body 202. The showerhead 230 (or lid) may be opened to allow access to the interior volume 206 of the processing chamber 200 in some embodiments, and may provide a seal for the processing chamber 200 while closed. A gas panel 258 may be coupled to the processing chamber 200 to provide process and/or cleaning gases to the interior volume 206 through the showerhead 230 or lid and nozzle. Showerhead 230 is used for processing chambers used for dielectric etch (etching of dielectric materials). The showerhead 230 may include a gas distribution plate (GDP) having multiple gas delivery holes 232 throughout the GDP. The showerhead 230 may include the GDP bonded to an aluminum showerhead base or an anodized aluminum showerhead base. The GDP 233 may be made from Si or SiC, or may be a ceramic such as $Y_2O_3$, $Al_2O_3$, YAG, and so forth. Showerhead 230 and delivery holes 232 may be characterized using system 100 or 150 in embodiments. For processing chambers used for conductor etch (etching of conductive materials), a lid may be used rather than a showerhead. The lid may include a center nozzle that fits into a center hole of the lid. The lid may be a ceramic such as $A_2O_3$, $Y_2O_3$, YAG, or a ceramic compound comprising $Y_4Al_2O_9$ and a solid-solution of $Y_2O_3$—$ZrO_2$. The nozzle may also be a ceramic, such as $Y_2O_3$, YAG, or the ceramic compound comprising $Y_4Al_2O_9$ and a solid-solution of $Y_2O_3$—$ZrO_2$. The lid, showerhead 230 (e.g., including showerhead base, GDP and/or gas delivery conduits/holes) and/or nozzle may be characterized using the system 100 or 150 according to an embodiment.

The substrate support assembly 248 is disposed in the interior volume 206 of the processing chamber 200 below the showerhead 230 or lid. The substrate support assembly 248 holds the substrate 244 during processing and may include an electrostatic chuck bonded to a cooling plate.

An inner liner may be on the periphery of the substrate support assembly 248. The inner liner may be a halogen-containing gas resist material such as those discussed with reference to the outer liner 216. In one embodiment, the inner liner 218 may be fabricated from the same materials of the outer liner 216. Additionally, the inner liner 218 may also be characterized using system 100 or 150 in embodiments.

Figure 3:
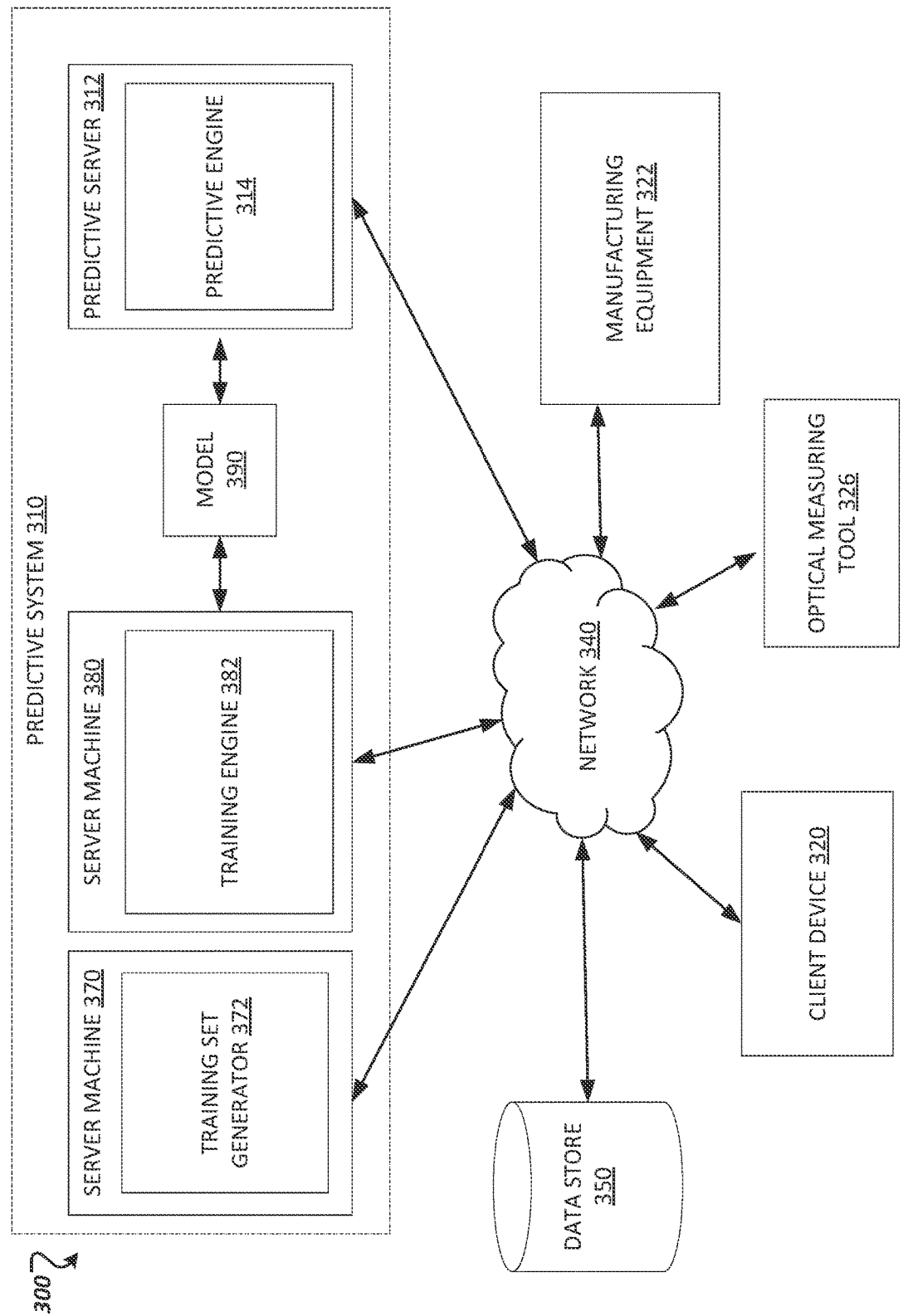
FIG. 3 depicts an illustrative computer system architecture, according to aspects of the present disclosure.

FIG. 3 depicts an illustrative computer system architecture 300, according to aspects of the present disclosure. Computer system architecture 300 includes a client device 320, manufacturing equipment 322, optical measuring tool 326, a predictive server 312 (e.g., to generate predictive data, to provide model adaptation, to use a knowledge base, etc.), and a data store 350. The predictive server 312 can be part of a predictive system 310. The predictive system 310 can further include server machines 370 and 380. In some embodiments, computer system architecture 300 can include or be a part of a manufacturing system for processing substrates, or optical measuring tool 326. Further details regarding the optical measuring tool 326 are provided with respect to FIGS. 1A-1B.

Components of the client device 320, manufacturing equipment 322, optical measuring tool 326, predictive system 310, and/or data store 350 can be coupled to each other via a network 340. In some embodiments, network 340 is a public network that provides client device 320 with access to predictive server 312, data store 350, and other publicly available computing devices. In some embodiments, network 340 is a private network that provides client device 320 access to manufacturing equipment 322, optical measuring tool 326, data store 350, and/or other privately available computing devices. Network 340 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 320 can include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc.

Manufacturing equipment 322 can produce products following a recipe. In some embodiments, manufacturing equipment 322 can include or be a part of a manufacturing system that includes one or more stations (e.g., process chambers, transfer chamber, load lock, factory interface, etc.) configured to perform different operations for a substrate.

Optical measuring tool 326 may be a tool (e.g., a system) for determining emissivity and/or roughness of the surface of a measured object. The optical measuring tool 326 may be configured to generate data associated with the emissivity and/or the surface roughness of an object measured by the optical measuring tool 326. In some embodiments, optical measuring tool corresponds to system 100A or system 100B. In some embodiments, such data (e.g., emissivity data, surface roughness data, etc.) can be stored in data store 350 where the data can be accessed (e.g., via network 340). The optical measuring tool 326 can include one or more sensors (e.g., multiple optical sensors) configured to detect radiation and generate data associated with the measured object. In some embodiments, the optical measuring tool 326 includes a radiation source to provide a radiation beam that is used to irradiate the surface of a measured object (e.g., a chamber component of a substrate processing chamber of manufacturing equipment 322, etc.). Radiation reflected and/or scattered by the surface of the object may be detected by the optical sensors of the optical measuring tool 326. In some embodiments, the optical measuring tool 326 can generate emissivity data and/or surface roughness data based on the intensity of reflected and/or scattered radiation that is detected by the optical sensors. In some embodiments, the optical measuring tool 326 can generate a surface roughness and/or emissivity profile map of a measured object surface by measuring emissivity and/or surface roughness at multiple locations on the surface of the measured object. In some embodiments, the optical measuring tool 326 can be included in systems used to manufacture components (e.g., processing chamber components) of manufacturing equipment 322.

Data store 350 can be a memory (e.g., random access memory), a drive (e.g., a hard drive, a flash drive), a database system, or another type of component or device capable of storing data. Data store 350 can include multiple storage components (e.g., multiple drives or multiple databases) that can span multiple computing devices (e.g., multiple server computers). The data store 350 can store emissivity data and surface roughness data (e.g., generated by optical measuring tool 326).

One or more portions of data store 350 can be configured to store data that is not accessible to a user of the manufacturing system. In some embodiments, all data stored at data store 350 can be inaccessible by the manufacturing system user. In other or similar embodiments, a portion of data stored at data store 350 is inaccessible by the user while another portion of data stored at data store 350 is accessible to the user. In some embodiments, inaccessible data stored at data store 350 is encrypted using an encryption mechanism that is unknown to the user (e.g., data is encrypted using a private encryption key). In other or similar embodiments, data store 350 can include multiple data stores where data that is inaccessible to the user is stored in a first data store and data that is accessible to the user is stored in a second data store.

In some embodiments, predictive system 310 includes server machine 370 and server machine 380. Server machine 370 includes a training set generator 372 that is capable of generating training data sets (e.g., a set of data inputs and a set of target outputs) to train, validate, and/or test a machine learning model 390 or set of machine learning models 390. Some operations of training set generator 372 are described in detail below with respect to FIGS. 4 and 5A. In some embodiments, the training set generator 372 can partition the training data into a training set, a validating set, and a testing set.

Server machine 380 can include a training engine 382. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 382 can be capable of training a machine learning model 390 or a set of machine learning models 390. The machine learning model 390 can refer to the model artifact that is created by the training engine 382 using the training data. The training data may include training inputs and corresponding target outputs (correct answers for respective training inputs). The training engine 382 can find patterns in the training data that map the training input to the target output (the answer to be predicted). The training engine 382 can then ultimately provide the machine learning model 390 that captures these patterns. The machine learning model 390 can include a linear regression model, a partial least squares regression model, a Gaussian regression model, a random forest model, a support vector machine model, a neural network, a ridge regression model, and so forth. In some embodiments, the machine learning model 390 is a physics-based model instead of or in addition to a machine learning model.

Training engine 382 can also be capable of validating a trained machine learning model 390 using a corresponding set of features of a validation set from training set generator 372. In some embodiments, training engine 382 can assign a performance rating for each of a set of trained machine learning models 390. A performance rating can correspond to an accuracy of a respective trained model, a speed of the respective model, and/or an efficiency of the respective model. Training engine 382 can select a trained machine learning model 390 having a performance rating that satisfies a performance criterion to be used by predictive engine 314, in accordance with some embodiments described herein. Further details regarding training engine 382 are provided with respect to FIG. 5A.

Predictive server 312 includes a predictive engine 314 that is capable of providing data from optical measuring tool 326 (e.g., emissivity data and/or surface roughness data) as input to trained machine learning model 390. Predictive engine may execute trained model 390 on the input to obtain one or more outputs. In embodiments, trained model 390 is trained on training data that includes surface profile maps of roughness and/or emissivity of a chamber component and one or more quality metrics of one or more processed substrates. As described further with respect to FIG. 5B, in some embodiments, predictive engine 314 processes input data (e.g., a surface profile of roughness and/or emissivity of a chamber component) using model 390 to predict substrate process results (e.g., one or more substrate quality metrics) for future substrates to be processed in a processing chamber using a chamber component measured by the optical measuring tool 326.

It should be noted that in some other implementations, the functions of server machines 370 and 380, as well as predictive server 312, can be provided by a larger or smaller number of machines. For example, in some embodiments, server machines 370 and 380 can be integrated into a single machine. In other embodiments, server machines 370 and 380 and/or predictive server 312 can be integrated into a single machine. In general, functions described in one implementation as being performed by server machine 370, server machine 380, and/or predictive server 312 can also be performed on client device 320. In addition, the functionality attributed to a particular component can be performed by different or multiple components operating together.

Figure 4:
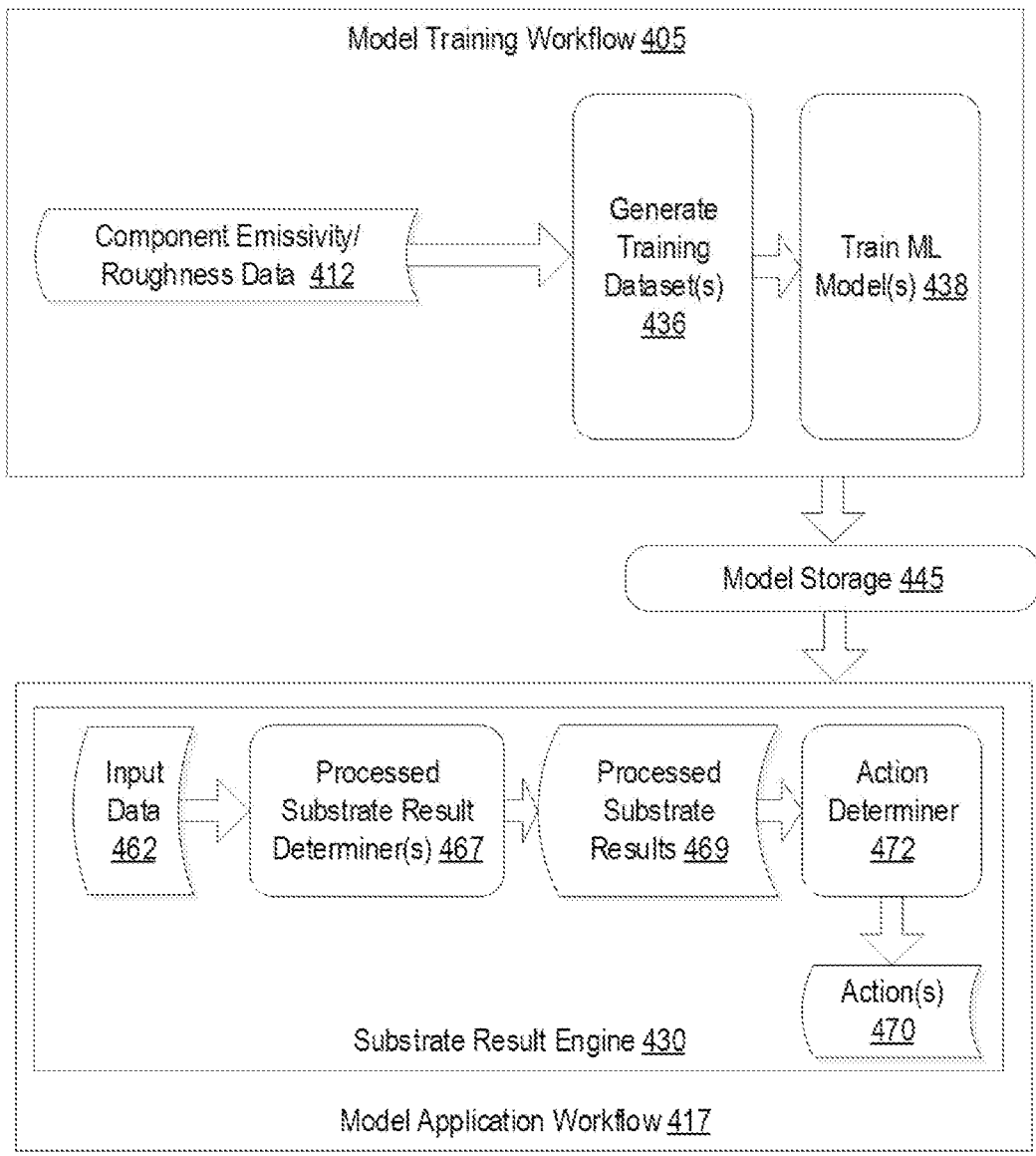
FIG. 4 illustrates a model training workflow and a model application workflow for determining predicted processed substrate results, according to aspects of the present disclosure.

FIG. 4 illustrates a model training workflow 405 and a model application workflow 417 for determining predicted processed substrate results from surface profile maps of one or more chamber components, according to one embodiment. Model training workflow 405 and model application workflow 417 may be performed by processing logic executed by a processor of a computing device. One or more of these workflows 405, 417 may be implemented, for example, by one or more machine learning models implemented on a processing device and/or other software and/or firmware executing on a processing device.

The model training workflow 405 is to train one or more machine learning models (e.g., deep learning models) to determine predicted substrate results for substrates processed in a process chamber that includes one or more chamber components having measured emissivity and/or roughness surface profiles. Model application workflow 417 is to apply the one or more trained machine learning models to perform substrate result assessment. Each of the component emissivity/roughness data 412 may include a surface emissivity and/or roughness at multiple locations of a chamber component of a processing chamber. For example, each of the component emissivity/roughness data 412 may include an array of surface emissivity and/or surface roughness measurements of the corresponding chamber component. In some embodiments, component emissivity/roughness data 412 includes one or more emissivity and/or roughness maps (e.g., profile maps) of a surface of an object (e.g., surface of a chamber component). In some embodiments, the emissivity and/or roughness maps may be generated via systems 100A or 100B as described herein above.

Various machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting.

In some embodiments, one or more machine learning models are trained to perform one or more substrate result estimation tasks. Each task may be performed by a separate machine learning model. Alternatively, a single machine learning model may perform each of the tasks or a subset of the tasks. For example, a first machine learning model may be trained to determine a substrate process result, and a second machine learning model may be trained to determine a corresponding corrective action. Additionally, or alternatively, different machine learning models may be trained to perform different combinations of the tasks. In an example, one or a few machine learning models may be trained. The trained machine learning (ML) model may be a single shared neural network that has multiple shared layers and multiple higher level distinct output layers, where each of the output layers outputs a different prediction, classification, identification, etc. For example, a first higher level output layer may determine a substrate process result based on input data corresponding to a first chamber component, and a second higher level output layer may determine a substrate process result based on input data corresponding to a second chamber component.

One type of machine learning model that may be used to perform some or all of the above tasks is an artificial neural network, such as a deep neural network. Artificial neural networks generally include a feature representation component with a classifier or regression layers that map features to a target output space. A convolutional neural network (CNN), for example, hosts multiple layers of convolutional filters. Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset.

For model training workflow 405, a training dataset containing hundreds, thousands, tens of thousands, hundreds of thousands or more instances of component emissivity/roughness data 412 (e.g., surface emissivity/roughness maps) should be used to form a training dataset. Data may include, for example, a chamber component emissivity measurement determined using a given number of measurements. In some embodiments, numerous measurements are performed to generate a surface emissivity map of the surface of the chamber component. This data may be processed to generate one or more training datasets 436 for the training of one or more machine learning models. Training data items in training datasets 436 may include component emissivity/roughness data 412, substrate results of substrates processed in a processing chamber using the measured chamber component, and/or one or more images of the processed substrates.

To effectuate training, processing logic inputs the training dataset(s) 436 into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above. Training may be performed by inputting input data such as component emissivity/roughness data 412, images, and/or processed substrate results into the machine learning model one at a time.

The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce.

Accordingly, the output may include one or more predictions or inferences (e.g., estimations of processed substrate results for substrates processed in a process chamber in which a measured substrate was processed using a particular chamber component). Processing logic may compare the output estimated substrate result(s) against historical substrate result(s). Processing logic determines an error (i.e., a classification error) based on the differences between the estimated substrate result(s) and the target substrate result(s). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criterion is met if accuracy of the machine learning model has stopped improving. If the stopping criterion has not been met, further training is performed. If the stopping criterion has been met, training may be complete. Once the machine learning model is trained, a reserved portion of the training dataset may be used to test the model. Once one or more trained machine learning models 438 are generated, they may be stored in model storage 445, and may be added to processed substrate result engine 430.

For model application workflow 417, according to one embodiment, input data 462 may be input into one or more processed substrate result determiners 467, each of which may include a trained neural network or other model. Additionally, or alternatively, one or more processed substrate result determiner(s) 467 may apply image processing algorithms to determine processed substrate results. The input data may include a chamber component surface emissivity and/or roughness profile map (e.g., measured/generated using an optical measuring tool as described herein). The input data may additionally optionally include one or more images of the measured chamber component. Based on input data 462, processed substrate result determiner(s) 467 may output one or more estimated processed substrate result(s) 469. The processed substrate result(s) 469 may include a predicted quality (e.g., thickness, uniformity, etc.) of one or more films to be deposited or etched on a substrate processed in a process chamber using the measured chamber component.

An action determiner 472 may determine, based on the processed substrate result(s) 469, one or more actions 470 to perform. In one embodiment, action determiner 472 compares the processed substrate result estimations to one or more processed substrate result thresholds. If one or more of the processed substrate result estimations meets or exceeds a processed substrate result threshold, then action determiner 472 may determine that replacing the chamber component and/or updating process parameters for future substrate processing is recommended. In such an instance, action determiner 472 may output a recommendation or notification to replace the chamber component and/or update process parameters. In some embodiments, action determiner 472 automatically updates process parameters(s) based on processed substrate result(s) 469 meeting one or more criteria. In some examples, processed substrate result(s) 469 may include an estimated condition of a substrate subsequent to one or more processing operations. In some embodiments, the estimated condition can be used to determine one or more updates to process parameters for future substrate processing in the processing chamber using the chamber component.

Figure 5A:
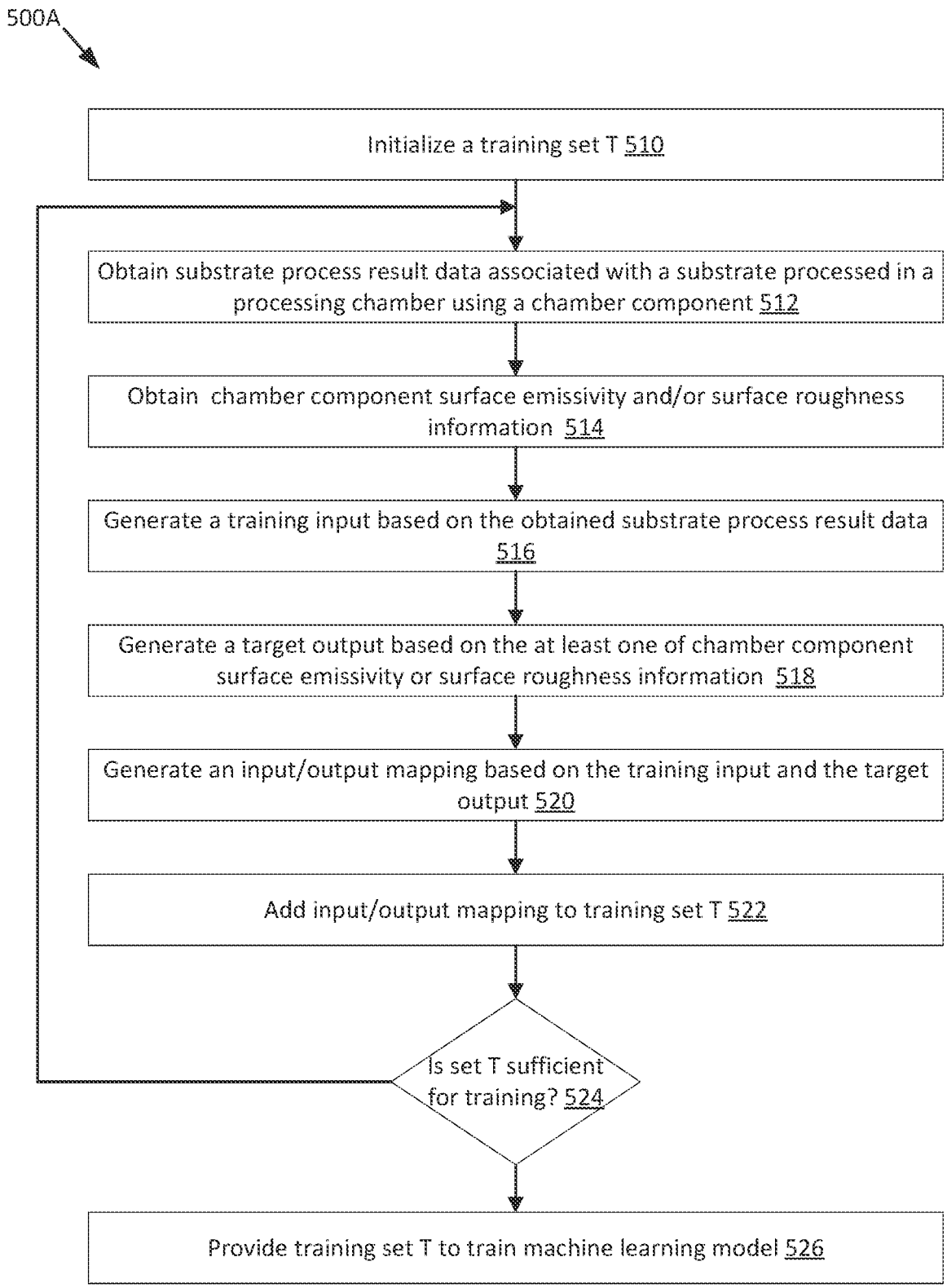
FIG. 5A is a flow chart of a method for generating a training dataset for training a machine learning model, according to aspects of the present disclosure.

FIG. 5A is a flow chart of a method 500A for generating a training dataset for training a machine learning model to perform substrate result assessment, according to aspects of the present disclosure. Method 500A is performed by processing logic that can include hardware (circuitry, dedicated logic, etc.), software (such as is run on a general purpose computer system or a dedicated machine), firmware, or some combination thereof. In one implementation, method 500A can be performed by a computer system, such as computer system architecture 300 of FIG. 3. In other or similar implementations, one or more operations of method 500A can be performed by one or more other machines not depicted in the figures.

At block 510, processing logic initializes a training set T to an empty set (e.g., { }).

At block 512, processing logic obtains substrate process result data (e.g., data associated with a surface of a film on a substrate, such as a film thickness, uniformity, etc.) associated with a substrate(s) processed at a processing chamber of a manufacturing system. In some embodiments, processing logic obtains historical substrate process result data corresponding to substrates processed in a processing chamber using one or more historical chamber components.

At block 514, processing logic obtains surface emissivity and/or surface roughness information for a component included in the processing chamber that processed the substrate(s) above. As described previously, the surface emissivity and/or surface roughness information may be obtained by an optical measurement tool (e.g., optical measuring tool 326 of FIG. 3) or a system for optically determining emissivity and/or surface roughness (e.g., system 200 or system 200) as described herein. In some embodiments, the surface emissivity and/or surface roughness information may include profile maps of surfaces of measured chamber components. In some embodiments, processing logic obtains historical chamber component surface roughness data and/or historical chamber component emissivity data corresponding to historical measurements of historical chamber components.

At block 516, processing logic generates a training input based on the data obtained for the chamber component surface emissivity and/or roughness at block 514. In some embodiments, the training input can include a normalized set of sensor data (e.g., normalized intensities of reflected and/or scattered radiation, normalized emissivity and/or surface roughness measurements, etc.).

At block 518, processing logic can generate a target output based on the substrate process result data obtained at block 512. The target output can correspond to substrate result metrics (data indicative of the quality of the processed substrate) of a substrate processed in the processing chamber.

At block 520, processing logic generates an input/output mapping. The input/output mapping refers to the training input that includes or is based on data for the chamber component, and the target output for the training input, where the target output identifies a substrate process result, and where the training input is associated with (or mapped to) the target output. At block 522, processing logic adds the input/output mapping to the training set T.

At block 524, processing logic determines whether the training set, T, includes a sufficient amount of training data to train a machine learning model. It should be noted that in some implementations, the sufficiency of training set T can be determined based simply on the number of input/output mappings in the training set, while in some other implementations, the sufficiency of training set T can be determined based on one or more other criteria (e.g., a measure of diversity of the training examples, etc.) in addition to, or instead of, the number of input/output mappings. Responsive to determining the training set, T, includes a sufficient amount of training data to train the machine learning model, processing logic provides the training set, T, to train the machine learning model. Responsive to determining the training set does not include a sufficient amount of training data to train the machine learning model, method 500 returns to block 512.

At block 526, processing logic provides the training set T to train the machine learning model. In some embodiments, the training set T is provided to training engine 382 of server machine 380 (e.g., of FIG. 3) to perform the training. In the case of a neural network, for example, input values of a given input/output mapping (e.g., spectral data and/or chamber data for a previous substrate) are input to the neural network, and output values of the input/output mapping are stored in the output nodes of the neural network. The connection weights in the neural network are then adjusted in accordance with a learning algorithm (e.g., backpropagation, etc.), and the procedure is repeated for the other input/output mappings in the training set T. After block 526, machine learning model (e.g., machine learning model 390 of FIG. 3) can be used to provide predicted substrate process results for substrates processed in the processing chamber using the measured chamber component.

Figure 5B:
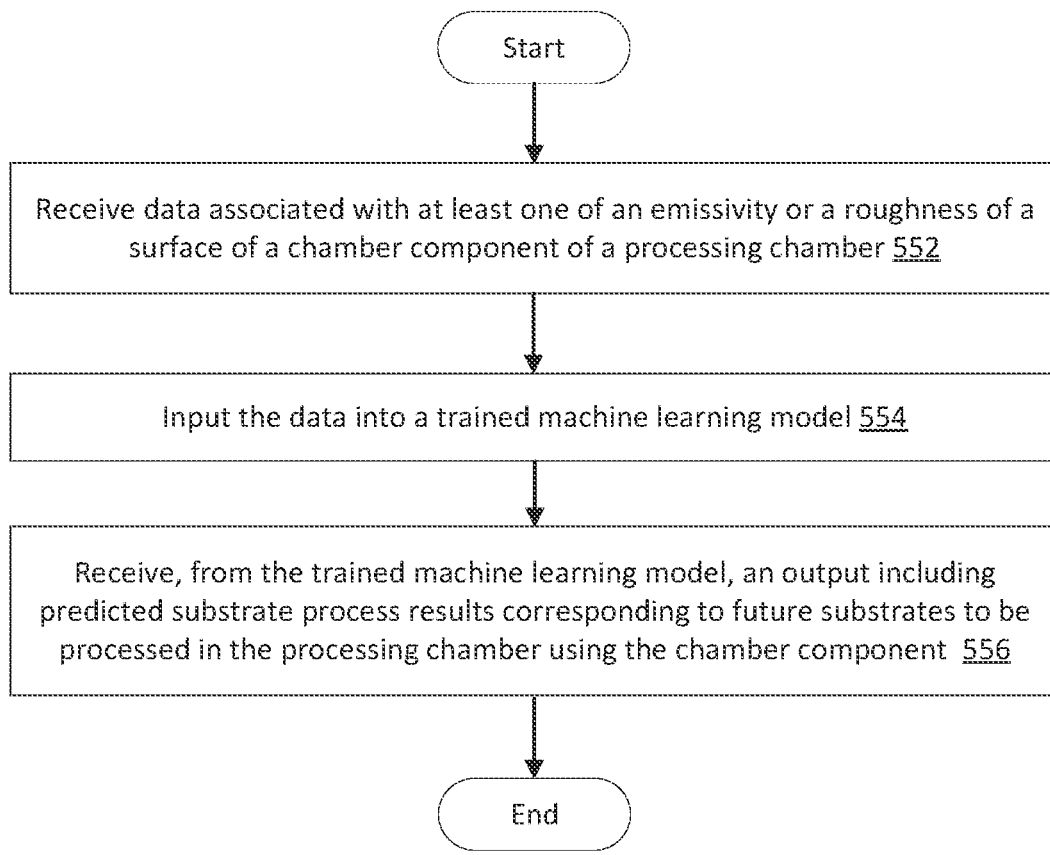
FIG. 5B is a flow chart of a method for generating predicted processed substrate results using a trained machine learning model, according to aspects of the present disclosure.

FIG. 5B is a flow chart of a method 500B for generating predicted processed substrate results using a trained machine learning model, according to aspects of the present disclosure. Method 500B is performed by processing logic that can include hardware (circuitry, dedicated logic, etc.), software (such as is run on a general purpose computer system or a dedicated machine), firmware, or some combination thereof. In one implementation, method 500B can be performed by a computer system, such as computer system architecture 300 of FIG. 3. In other or similar implementations, one or more operations of method 500B can be performed by one or more other machines not depicted in the figures.

At block 552, processing logic receives data associated with the emissivity and/or the roughness of a surface of a chamber component of a processing chamber. In some embodiments, the data is received from an optical measurement tool (e.g., optical measuring tool 326 of FIG. 3) or a system for optically determining emissivity and/or surface roughness (e.g., system 100A or system 100B) as described herein. The data may be raw sensor data, or may be data that has been processed (e.g., by a processing device, a computing device, etc.) to determine the surface emissivity and/or roughness. In some embodiments, the data is in the form of one or more surface profile maps that indicate surface emissivity and/or roughness.

At block 554, processing logic inputs the data received at block 552 into a trained machine learning model. In some embodiments, the trained machine learning model is trained using techniques described herein with reference to FIGS. 3, 4 and/or FIG. 5A. The trained machine learning model may be trained with data input including historical surface roughness and/or surface emissivity data that is labeled with corresponding target output data including historical substrate process result data. The trained machine learning model may be trained to output one or more predicted substrate process results based on data input associated with the surface emissivity and/or roughness of a chamber component.

At block 556, processing logic receives, from the trained machine learning model, an output including predicted substrate process results that correspond to future substrates to be processed in the processing chamber using the chamber component. In some embodiments, the surface emissivity and/or roughness of the chamber component may affect the results of substrate processed in a processing chamber. The predicted substrate process results may reflect those affects.

Figure 6:
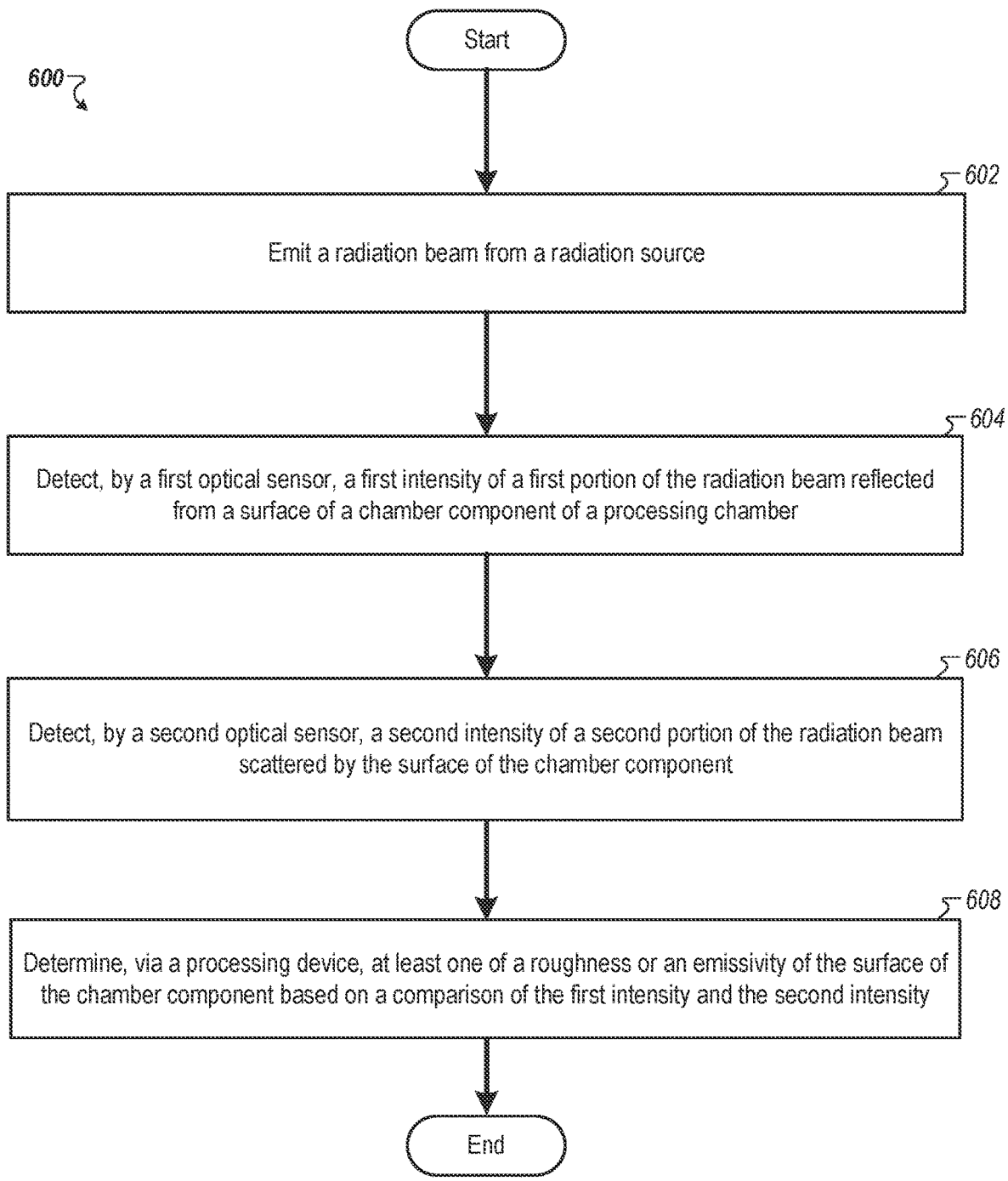
FIG. 6 is a flow chart of a method for optically determining emissivity and/or surface roughness of objects, according to aspects of the present disclosure.

FIG. 6 is a flow chart of a method 600 for optically determining emissivity and/or surface roughness, according to aspects of the present disclosure. Method 600 is performed by a system that can include hardware (circuitry, dedicated logic, optical measuring tools as described herein, etc.), software (such as is run on a general purpose computer system or a dedicated machine), firmware, or some combination thereof. In one implementation, method 600 can be performed by a computer system, such as computer system architecture 300 of FIG. 3. In other or similar implementations, one or more operations of method 600 can be performed by one or more other machines not depicted in the figures.

At block 602, a radiation source of the system emits a radiation beam. In some embodiments, the radiation beam is a beam of infrared radiation (e.g., output by a laser) in the mid-IR range. For example, the radiation beam may have a wavelength in a range of 1-6 μm. In another example, the radiation beam may have a wavelength in a range of 3-5 μm. In some embodiments, the radiation source is a mid-infrared supercontinuum laser emitter configured to operate in the mid-IR range. Thus, in some embodiments, the radiation beam is a mid-IR infrared laser beam. In some embodiments, the radiation beam is directed toward the surface of an object via one or more mirrors, optical filters (e.g., polarizing filters), lenses, and/or beam splitters. The surface of the object may cause a portion of the radiation beam to be reflected and/or may cause a portion (e.g., another portion) of the radiation beam to be scattered, due, at least in part, to the emissivity and/or roughness of the surface of the object. In some embodiments, the object is a chamber component of substrate processing chamber.

At block 604, a first optical sensor of the system detects an intensity of the portion of the radiation beam that is reflected from the surface of the object (e.g., chamber component). The intensity of the reflected radiation may be indicative of at least the emissivity and/or roughness of the object surface. In some embodiments, the reflected portion of the beam is directed to the first optical sensor via one or more mirrors, lenses, and/or beam splitters. In some examples, the reflected portion of the radiation beam retraces at least a portion of the path back toward the radiation source. A beam splitter may direct the reflected radiation from the path toward the optical sensor.

At block 606, a second optical sensor of the system detects an intensity of the portion of the radiation beam that is scattered by the surface of the object (e.g., chamber component). The intensity of the scattered radiation may be indicative of at least the emissivity and/or roughness of the object surface. In some embodiments, the scattered radiation is collected by a reflective objective (e.g., a Schwarzschild objective) and directed (e.g., reflected and/or focused) toward the second optical sensor. In some embodiments, the reflective objective is disposed substantially above the object (e.g., as illustrated in FIGS. 1A and 1B). One or more mirrors, optical filters, lenses, etc. may direct, process, manipulate, reflect, etc. the scattered radiation in some embodiments.

At block 608, a processing device communicatively coupled to the first optical sensor and the second optical sensor may determine (e.g., via processing logic) at least one of a roughness of the surface of the object (e.g., chamber component) or an emissivity of the surface of the object. In some embodiments, the processing device makes this determination based on a comparison of the intensity of the reflected radiation and the intensity of the scattered radiation, as described herein above. In some embodiments, manufacturing process parameters (e.g., a manufacturing recipe, manufacturing operations, etc.) corresponding to the object are updated (e.g., adjusted) based on the measured roughness and/or the measured emissivity. For example, a manufacturing process for a chamber component can be updated based on a measured value of the surface roughness and/or the emissivity of the surface of a sample chamber component. In such an example, the measured value may indicate that the sample chamber component does not meet a target threshold (e.g., a target surface roughness threshold and/or a target emissivity threshold). The update to the manufacturing process may be to manufacture future chamber components within the target threshold according to the updated manufacturing process parameters.

In some embodiments, the processing device is communicatively coupled to a third optical sensor (e.g., a normalizing sensor, optical sensor 108 of FIG. 1, etc.). A signal received by from the third optical sensor may be used by the processing device to normalize the signals received from the first and second optical sensors (e.g., to normalize the intensities of the reflected and/or scattered radiation). In some embodiments, a surface map of the object is generated by capturing multiple measurements at different locations of the surface of the object. The surface map may be indicative of the surface roughness and/or emissivity across the surface of the object. The surface map may be generated by multiple individual measurements over the surface of the object, in some embodiments. The map may alternatively be generated by a surface scanning operation (e.g., performed by system 100B of FIG. 1).

Figure 7:
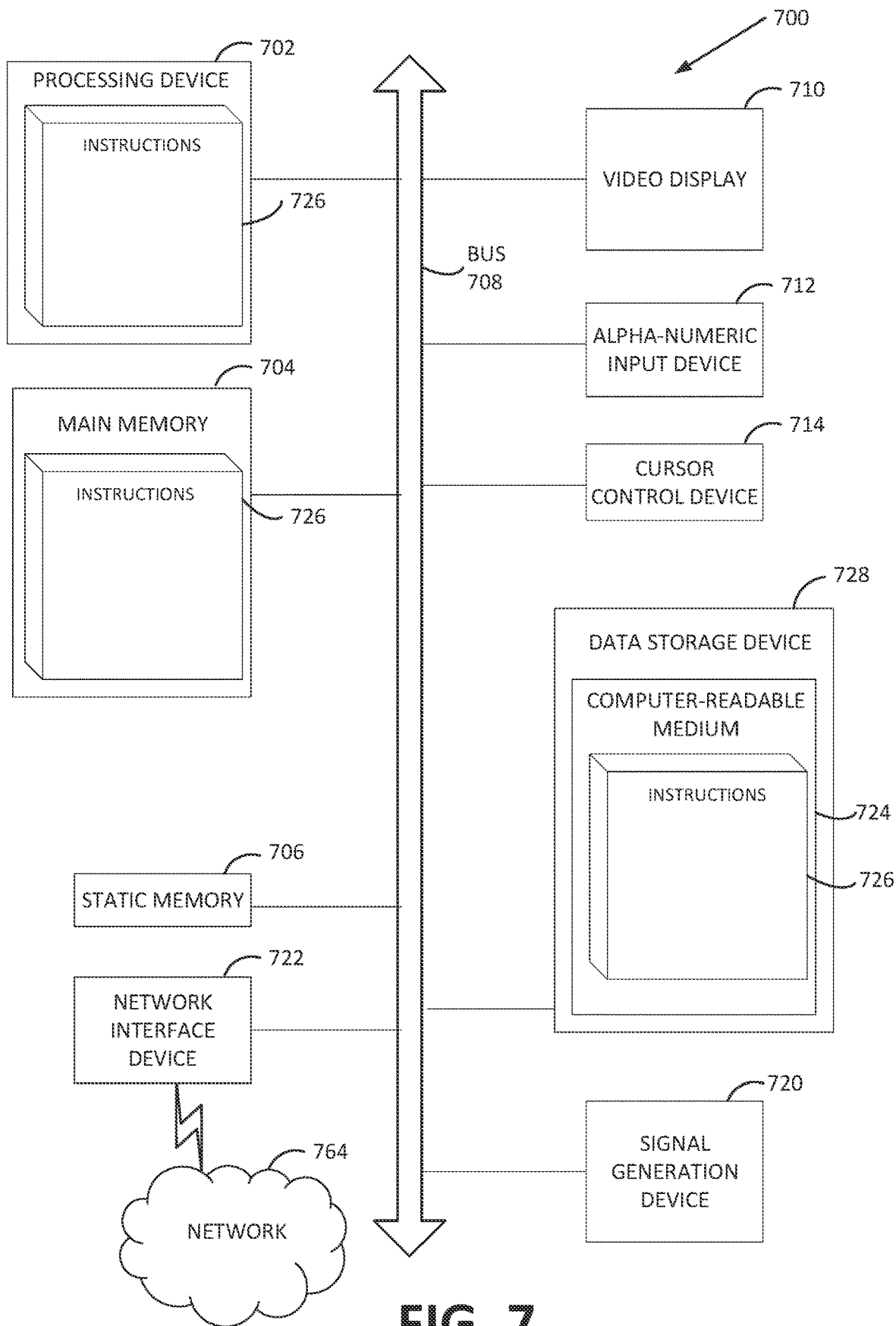
FIG. 7 depicts a diagrammatic representation of a machine in the example form of a computing device within which a set of instructions, for causing the machine to perform any one or more of the methodologies discussed herein, can be executed.

FIG. 7 depicts a diagrammatic representation of a machine in the example form of a computing device 700 within which a set of instructions, for causing the machine to perform any one or more of the methodologies discussed herein, can be executed. In alternative embodiments, the machine can be connected (e.g., networked) to other machines in a Local Area Network (LAN), an intranet, an extranet, or the Internet. The machine can operate in the capacity of a server or a client machine in a client-server network environment, or as a peer machine in a peer-to-peer (or distributed) network environment. The machine can be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiments, computing device 700 can correspond to one or more of server machine 370, server machine 380, or predictive server 312 as described herein.

The example computing device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 728), which communicate with each other via a bus 708.

Processing device 702 can represent one or more general-purpose processors such as a microprocessor, central processing unit, or the like. More particularly, the processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. Processing device 702 can also be or include a system on a chip (SoC), programmable logic controller (PLC), or other type of processing device. Processing device 702 is configured to execute the processing logic for performing operations discussed herein.

The computing device 700 can further include a network interface device 722 for communicating with a network 764. The computing device 700 also can include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 728 can include a machine-readable storage medium (or more specifically a non-transitory computer-readable storage medium) 724 on which is stored one or more sets of instructions 726 embodying any one or more of the methodologies or functions described herein. A non-transitory storage medium refers to a storage medium other than a carrier wave. The instructions 726 can also reside, completely or at least partially, within the main memory 704 and/or within the processing device 702 during execution thereof by the computer device 700, the main memory 704 and the processing device 702 also constituting computer-readable storage media.

While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure can be practiced without these specific details. In other instances, well-known components or methods are not described in detail or are presented in simple block diagram format in order to avoid unnecessarily obscuring the present disclosure. Thus, the specific details set forth are merely exemplary. Particular implementations can vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method can be altered so that certain operations can be performed in an inverse order so that certain operations can be performed, at least in part, concurrently with other operations. In another embodiment, instructions or sub-operations of distinct operations can be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
   a radiation source configured to emit a radiation beam;
   a first optical sensor configured to detect a first intensity of a first portion of the radiation beam reflected from a surface of an object;
   a second optical sensor configured to detect a second intensity of a second portion of the radiation beam scattered by the surface of the object and collected by a reflective objective; and
   a processing device communicatively coupled to the first optical sensor and the second optical sensor, wherein the processing device is configured to determine at least one of a roughness of the surface of the object or an emissivity of the surface of the object based on a comparison of the first intensity and the second intensity.

2. The system of claim 1, wherein the radiation source comprises a mid-infrared supercontinuum laser.

3. The system of claim 1, further comprising:
   a mirror configured to direct the radiation beam towards the object; and
   the reflective objective configured to receive the second portion of the radiation beam scattered by the surface of the object and direct the second portion of the radiation beam to the second optical sensor.

4. The system of claim 3, wherein the reflective objective comprises a Schwarzschild objective.

5. The system of claim 3, further comprising:
   a beam splitter disposed along an optical axis between the radiation source and the mirror, wherein the first portion of the radiation beam reflected off of the surface of the object is reflected off of the mirror, travels back through one or more lenses, and is directed by the beam splitter to the first optical sensor.

6. The system of claim 5, further comprising:
   a third optical sensor, wherein the beam splitter is configured to direct a fraction of the radiation beam emitted by the radiation source toward the third optical sensor, wherein the third optical sensor is configured to detect a third intensity of the fraction of the radiation beam, and wherein the processing device is configured to normalize the detected first intensity and the detected second intensity based on the detected third intensity.

7. The system of claim 6, further comprising:
   a polarizing filter disposed along the optical axis between the radiation source and the beam splitter, the polarizing filter configured to polarize the radiation beam emitted from the radiation source.

8. The system of claim 1, further comprising:
   one or more lenses configured to focus the radiation beam, wherein the radiation beam is focused to a spot size of less than approximately 200 microns in diameter on the surface of the object.

9. The system of claim 8, further comprising:
   a rotatable mirror configured to direct the radiation beam emitted by the radiation source toward the one or more lenses, wherein the rotatable mirror is configured to cause the radiation beam to periodically move across the surface of the object responsive to rotation of the rotatable mirror.

10. The system of claim 9, wherein the system detects at least one of emissivity or roughness with a measurement system variation of less than 0.1%.

11. A method comprising:
    emitting, from a radiation source, a radiation beam;
    detecting, by a first optical sensor, a first intensity of a first portion of the radiation beam reflected from a surface of a chamber component of a processing chamber;
    detecting, by a second optical sensor, a second intensity of a second portion of the radiation beam scattered by the surface of the chamber component and collected by a reflective objective; and
    determining, via a processing device communicatively coupled to the first optical sensor and the second optical sensor, at least one of a roughness of the surface of the chamber component or an emissivity of the surface of the chamber component based on a comparison of the first intensity and the second intensity.

12. The method of claim 11, wherein the radiation source comprises a mid-infrared supercontinuum laser.

13. The method of claim 11, further comprising:
    detecting, via a third optical sensor, a third intensity of a fraction of the radiation beam emitted by the radiation source directed toward the third optical sensor by a beam splitter disposed along an optical axis between the radiation source and a mirror, wherein the mirror is configured to direct the radiation beam toward the chamber component; and
    normalizing the detected first intensity and the detected second intensity based on the detected third intensity.

14. The method of claim 11, further comprising:
inputting, into a model, data associated with at least one of the emissivity or the roughness of the surface of the chamber component; and
receiving, from the model, an output comprising predicted substrate process results, wherein the predicted substrate process results correspond to future substrates to be processed using the chamber component.

15. The method of claim 14, wherein the model comprises a trained machine learning model.

16. The method of claim 11, further comprising:
training a machine learning model to produce a trained machine learning model, wherein the machine learning model is trained with data input comprising one or more of historical chamber component surface roughness data, historical chamber component emissivity data, data corresponding to the roughness of the surface of the chamber component, and data corresponding to the emissivity of the surface of the chamber component, wherein the data input is labeled with corresponding target output data comprising historical substrate process result data corresponding to substrates processed with one or more historical chamber components.

17. The method of claim 11, further comprising:
scanning the surface of the component with the radiation beam by causing the radiation beam to periodically move across the surface of the component responsive to rotation of a rotatable second mirror.

18. A non-transitory machine-readable storage medium comprising instructions that, when executed by a processing device, cause the processing device to perform operations comprising:
receiving data associated with at least one of an emissivity or a roughness of a surface of a chamber component of a processing chamber;
inputting, into a trained machine learning model, the data associated with at least one of the emissivity or the roughness of the surface of the chamber component; and
receiving, from the trained machine learning model, an output comprising predicted substrate process results, wherein the predicted substrate process results correspond to future substrates to be processed in the processing chamber using the chamber component.

19. The non-transitory machine-readable storage medium of claim 18, wherein the trained machine learning model is trained with data input comprising one or more of historical chamber component surface roughness data, historical chamber component emissivity data, data corresponding to the roughness of the surface of the chamber component, and data corresponding to the emissivity of the surface of the chamber component, wherein the data input is labeled with corresponding target output data comprising historical substrate process result data corresponding to substrates processed with one or more historical chamber components.

20. The non-transitory machine-readable storage medium of claim 18, wherein receiving data associated with at least one of the emissivity or the roughness of the surface of the chamber component comprises:
receiving, from a first optical sensor, first sensor data indicative of a first intensity of a first portion of a radiation beam reflected from the surface of the chamber component; and
receiving, from a second optical sensor, second sensor data indicative of a second intensity of a second portion of the radiation beam scattered by the surface of the chamber component,
wherein at least one of the emissivity or the roughness of the surface is based on a comparison of the first intensity and the second intensity.

* * * * *